Figure 1:
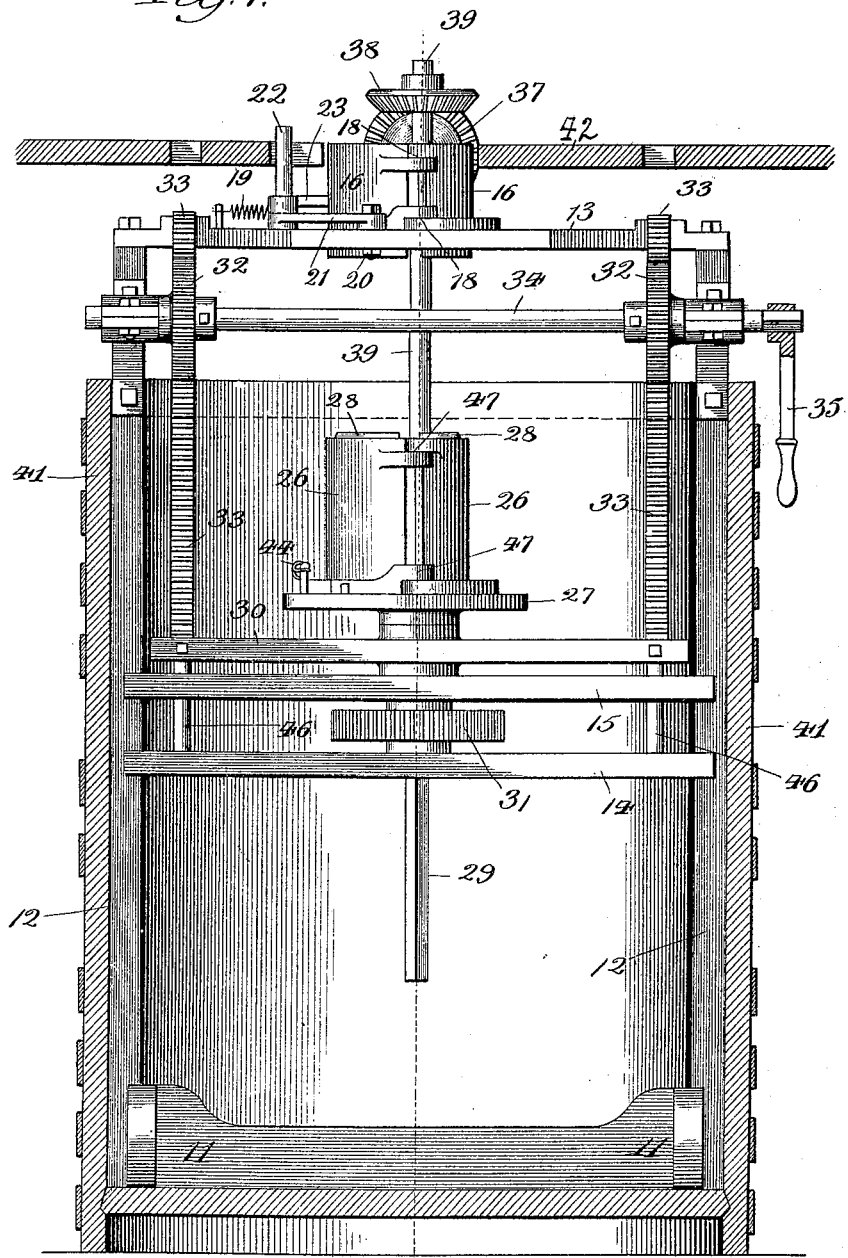

No. 611,612. Patented Oct. 4, 1898.
L. H. DOLAN.
GLASS BLOWING MACHINE.
(Application filed Jan. 6, 1898.)
(No Model.) 3 Sheets—Sheet 1.

Witnesses:

Inventor,
Lawrence H Dolan
By Dwight B Cheever
Atty

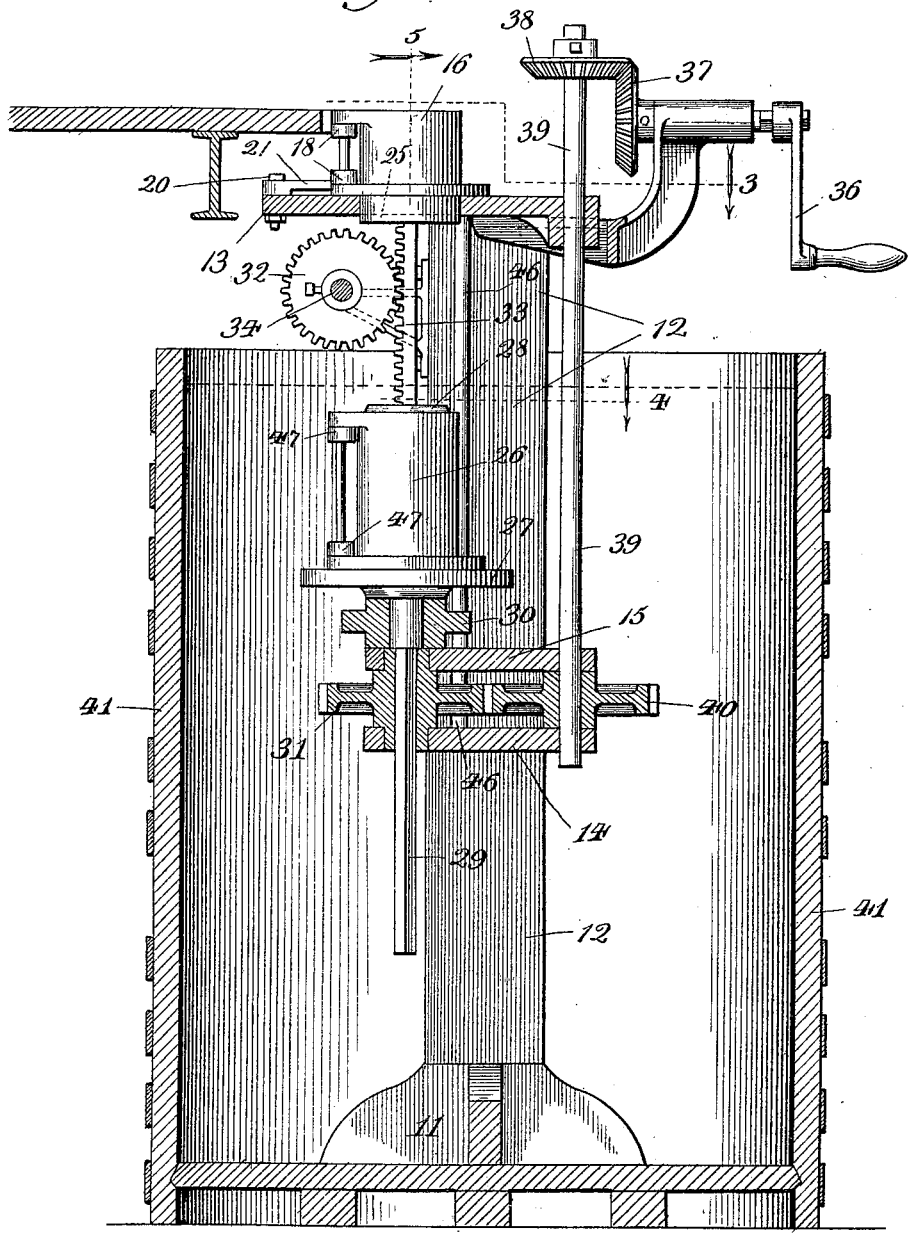

No. 611,612. Patented Oct. 4, 1898.
L. H. DOLAN.
GLASS BLOWING MACHINE.
(Application filed Jan. 6, 1898.)
(No Model.) 3 Sheets—Sheet 3.
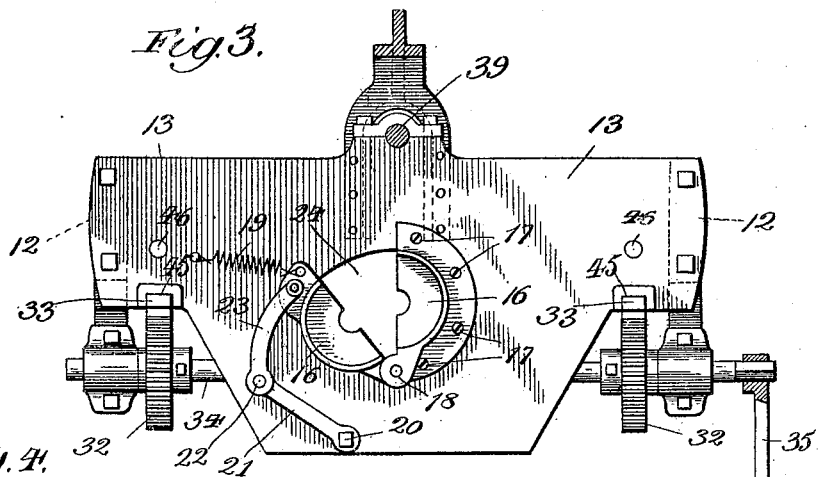
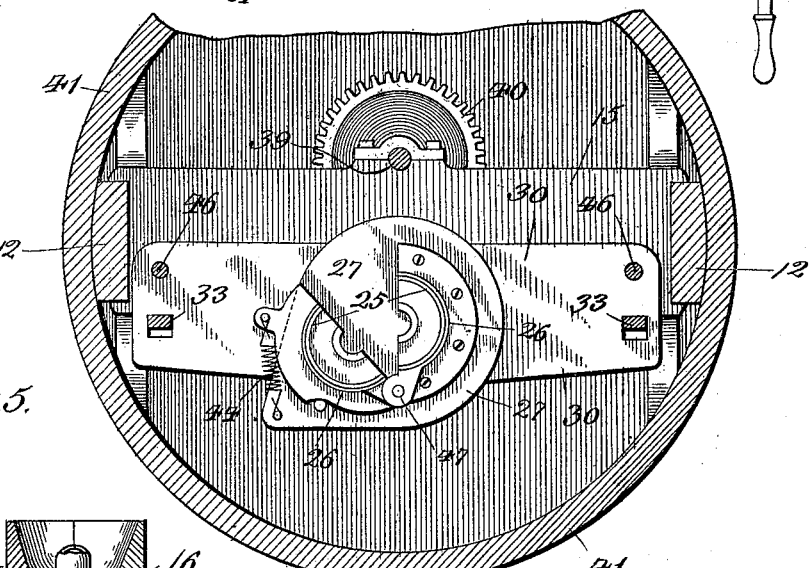
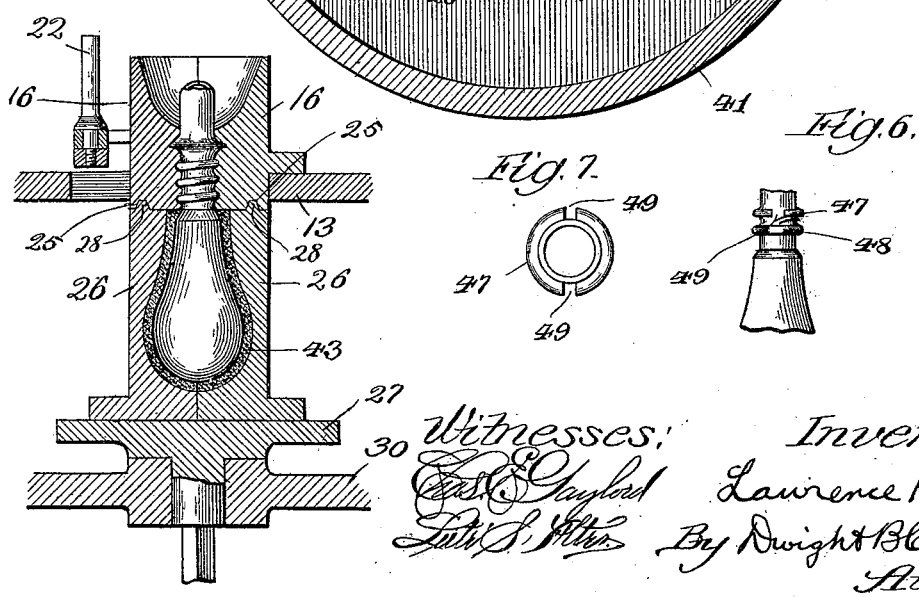
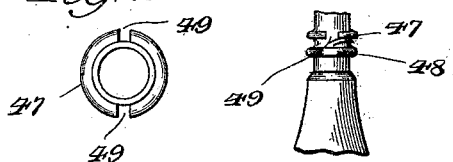
Witnesses:
Inventor:
Lawrence H. Dolan
By Dwight B. Cheever,
Atty.

UNITED STATES PATENT OFFICE.

LAWRENCE H. DOLAN, OF ALEXANDRIA, INDIANA, ASSIGNOR OF ONE-HALF TO THE LIPPINCOTT GLASS COMPANY, OF SAME PLACE AND CINCINNATI, OHIO.

GLASS-BLOWING MACHINE.

SPECIFICATION forming part of Letters Patent No. 611,612, dated October 4, 1898.

Application filed January 6, 1898. Serial No. 665,779. (No model.)

*To all whom it may concern:*

Be it known that I, LAWRENCE H. DOLAN, a citizen of the United States, and a resident of Alexandria, in the county of Madison and State of Indiana, have invented a certain new and useful Glass-Blowing Machine, of which the following is a specification in its best form now known to me.

My invention relates to glass-blowing machines, and is particularly adapted to form bulbs of incandescent electric lamps and other glass articles requiring a screw or other means for connecting its neck with such other article as it may be desirable to attach to it.

The object of my invention is to provide a suitable machine for properly molding the smooth surface desired on the exposed portion of the bulb or other article and the screw or engaging portion, so that they may be blown in one operation without having the usual objectionable mold-marks upon the portion designed to remain exposed. I accomplish this object by blowing the screw or irregular portion in a section of the mold which is so shaped as to form the screw or engaging surface and held stationary while that portion of the mold embracing the remainder of the article is given a rotary motion, thus giving it a smooth surface and avoiding the usual ridges.

The accompanying drawings show my invention embodied in a form which I recommend.

Figure 1 is a side elevation of my improved machine. Fig. 2 is a transverse partial sectional view on the line 2 of Fig. 1; Fig. 3, a plan view taken on line 3; Fig. 4, a plan view on line 4, and Fig. 5 a detail sectional view of the mold-sections on line 5 of Fig. 2. Fig. 6 shows a side and Fig. 7 a plan view of a modified form of lamp-socket, which is only one of many forms which, with proper molds, may be made with my machine.

In the drawings similar figures represent similar parts.

11 is a standard or base upon which my machine rests and from which rise two supports 12, rigidly connected at the top by the table 13 and intermediately by the two plates 14 and 15.

16 is the upper section of the hinged mold for making the screw portion of the lamp. One part is fastened to table 13 by screws 17, and the other part is hinged to it at 18 and is normally held open by spring 19. The whole mold projects down through the opening 24, the bottom of the mold being flush with the bottom of the table. Pivoted to table 13 at 20 is a lever 21, having pivotally connected to it by means of a rod 22 another lever 23, pivoted in turn to the hinged portion of mold-section 16. By pressing against rod 22 the mold-section may be closed against the tension of spring 19. On the under side of mold-section 16 is a circular groove having its center in the axis of the mold.

Directly below mold-section 16 is a corresponding mold-section 26, having one half securely attached to a circular plate by screws or other suitable means and the other half adapted to open and close about hinge 47, the axis of plate 27 and mold-section being in the axis of the upper mold-section 16. On top of this mold-section and having its center concentric with the axis of mold-sections 16 and 26 is the circular ridge 28, which is adapted to fit in circular groove 25 on the under side of mold-section 16. The mold-section 26 is normally held open by a spring 44, and the hinge is so designed that when this mold-section is open, the ridge 28 will be exactly under the circular groove 25 of mold-section 16 when held open by spring 19. The ridge is made of a V shape, so that it will readily engage with the groove, though they may happen not to be exactly under each other. When the ridge of mold-section 26 is in the groove of section 16, the mold-sections are locked together, so that opening or shutting mold-section 16 will open or shut lower mold-section 26, and when the two mold-sections are closed the lower section 26 can be rotated while upper section 16 remains stationary. It is evident that the circular ridge may be placed upon the upper and the groove upon the lower mold-section without changing the principle of my invention.

Plate 27 is rigidly attached to the upper end of a shaft 29, journaled in a plate 30 and having below the journaled portion an approximately square portion which passes through openings in plates 14 and 15 and through a square hole in gear-wheel 31. The hole in gear 31 is of such size that the shaft and the parts attached to it may be freely moved up and down, while at the same time allowing power to be transmitted through the wheel to the shaft.

While a square shaft and hole are more convenient to make, they may be of any convenient cross-section which will enable the shaft to rotate with the gear and to slide vertically through it without disturbing their engagement. Journaled to the frames 12 are two gear-wheels 32, meshing in two racks 33, each having one end attached to plate 30 and the other end being free to slide through notches 45 in table 13. Plate 30 is mounted on and adapted to slide up and down on rods 46, secured to the table 13 and plates 14 and 15.

34 is a shaft on which gears 32 are mounted, and 35 is a handle on the end of the shaft by which the wheels may be given a turn and the rack 33 and platform 30 moved up and down a distance not less than the height of the lower mold 36. Power is applied to gear 31 by means of the crank 36, the bevel-gears 37 and 38, the shaft 39, (journaled in table 13 and plates 14 and 15,) and gear-wheel 40, meshing with gear 31.

41 is a tank in which the lower part of the machine is placed and is filled with water to a depth to cover mold-section 26 when it is at its lowest position, and 42 is a working floor, preferably about on a level with the top of the machine, upon which the blower stands. An assistant is employed to operate the lever 35 and turn the crank 36.

In the modified form of electric-lamp stem shown in Figs. 6 and 7, 47 and 48 are annular rings, and the ring 47 has two notches 49 on the opposite sides, so that the bulb or article may be inserted in a socket past lugs in the side of the socket and then partly turned so that the lugs will be between rings 47 and 48, and thus hold the lamp in the socket. To mold a lamp with these rings and the notches 49, the part of the mold which forms them will have to be held stationary, as in the case of the screw-stem. This is only one of many forms which, where a locking device other than a screw is required, may be made with my machine without departing from my invention.

The upper or stationary mold-section 16 is made preferably of cast metal and has on its inner surface a screw-thread or surface corresponding to the desired engaging surface (an example of which is shown in Figs. 6 and 7) against which the molten glass is blown, thus forming the screw-thread or other engaging surface on the neck of the article. The lower or rotating mold-section is coated with a composition or paste 43, which is liable to burn when in contact with the molten glass unless the mold is kept cool by plunging it in water when each article is blown.

The machine is operated as follows: The assistant or helper first throws lever 35 and raises mold-section 26 into contact with mold-section 16, (ridge 28 fitting in groove 25.) The blower, standing on the working floor above, places a lump of hot glass in the two mold-sections and closes them by pressing the rod 22 with his foot and begins to blow into the glass, while the assistant rotates the lower mold-section by turning the crank 36, as described. The rotating lower mold-section gives the lower portion of the object blown a smooth regular surface. When the blowing is completed, the machine is stopped, the blower removes his foot from rod 22, and the mold-sections open under action of the springs, and the finished product of the operation is removed. The assistant now reverses lever 35, thus lowering mold-section 26 into the water and cooling it, when he turns the lever 35 to bring the mold-section 26 again in contact with mold-section 16, when the operation is repeated.

It has heretofore been the practice to blow incandescent electric bulbs with a smooth stem and fasten a brass screw-piece over the stem by using plaster-of-paris or other cement. My invention, as above shown, blows the glass stem in the form of a screw, thus dispensing with the brass and cement and the labor of applying them and enabling the glass to make its own engagement with a metallic cap or engaging surface. This is adapted to the manufacture of a variety of glassware other than those hereinbefore specifically mentioned.

Having thus described my invention, what I claim as new, and desire to secure by Letters Patent, is—

1. In a glass-blowing machine, in combination, a stationary mold-section, a second mold-section in contact therewith, rotatable about the axis of said stationary mold-section, each of said mold-sections being hinged at one side, the axis of said hinges being in the same line parallel to the axis of the mold-sections, means for holding said mold-sections open, means whereby said mold-sections may be closed, and means for rotating said rotatable mold-section about its axis while in contact with said stationary mold-section.

2. In a glass-blowing machine, the combination of a stationary mold-section adapted to be opened or closed upon a hinge, a circular groove in the bottom of said mold-section, a second mold-section rotatable about the axis of said first mold-section also adapted to be opened and closed upon a hinge, the axis of the two hinges being coincident, and a circular ridge upon the top of said second mold-section, adapted to fit and slide in said circular groove, whereby when the mold-sections are in contact, opening or closing, one mold-section will open or close the other mold-section.

3. In a glass-blowing machine, the combination of a stationary mold-section adapted to be opened or closed upon a hinge, a circular groove in the bottom of said mold-section, a second mold-section rotatable about the axis of said first mold-section also adapted to be opened and closed upon a hinge, the axis of the two hinges being coincident, a circular ridge upon the top of said second mold-section adapted to fit and slide in said circular groove whereby when the mold-sections are in contact, opening or closing, one mold-section will open or close the other mold-section, and means for rotating said rotatable mold-section.

4. In a glass-blowing machine, the combination of a stationary mold-section adapted to be opened or closed upon a hinge, a circular groove in the bottom of said mold-section, a second mold-section rotatable about the axis of said first mold-section also adapted to be opened and closed upon a hinge, the axis of the two hinges being coincident, a circular ridge upon the top of said second mold-section adapted to fit and slide in said circular groove whereby when the mold-sections are in contact, opening or closing, one mold-section will open or close the other mold-section, and means for moving said rotatable mold-section into and out of contact with said stationary mold-section.

5. In a glass-blowing machine, the combination of a stationary mold-section adapted to be opened or closed upon a hinge, a circular groove in the bottom of said mold-section, a second mold-section rotatable about the axis of said first mold-section also adapted to be opened and closed upon a hinge, the axis of the two hinges being coincident, a circular ridge upon the top of said second mold-section adapted to fit and slide in said circular groove whereby when the mold-sections are in contact, opening and closing, one mold-section will open or close the other mold-section, means for moving said rotatable mold-section into and out of contact with said stationary mold-section and means for rotating said rotatable mold-section.

6. In a glass-blowing machine, the combination of a mold-section divided substantially in the middle and hinged at one side, means for rigidly securing one half of said mold-section to the table of the machine, means for holding the other half of said mold-section normally open, and a circular groove on the bottom of said mold, having its center in the axis of said mold-section adapted to fit over a circular ridge on the top of a lower mold-section for the purposes set forth.

7. In a glass-blowing machine, the combination of a mold-section divided substantially in the middle and hinged at one side, means for rigidly securing one half of said mold-section to the table of the machine, means for holding the other half of said mold-section normally open, a system of levers at the side of said mold-section adapted to open and close said mold-section and a circular groove on the bottom of said mold-section having its center in the axis of said mold-section adapted to fit over a circular ridge on the top of a lower mold-section for the purposes set forth.

8. In a glass-blowing machine, the combination of a mold-section divided in the middle and hinged at one side, means for rigidly securing one-half of said mold-section to a rotatable shaft.

9. In a glass-blowing machine, the combination of a fixed mold-section, a movable plate, a vertical shaft journaled in the plate, a mold-section attached to the upper end of said shaft, a rack attached to said plate and a pinion geared with the rack whereby when said pinion is turned said mold-section is moved up or down to and from said fixed section.

10. In a glass-blowing machine, the combination of two mold-sections in contact with each other, one section movable, means connecting said sections so that when the sections are in contact one section may be rotated about the axis of both sections while the other section remains at rest, and means whereby opening one section will open the other.

11. In a glass-blowing machine, the combination of two mold-sections in contact with each other, means for rotating one section about their common axis relative to the other, a tank of water or other cooling liquid, means for moving one of said mold-sections along its axis out of contact with said first section into said tank of liquid and back to its original position.

12. In a glass-blowing machine, in combination, a stationary mold-section, a second mold-section in contact therewith rotatable about the axis of said stationary mold-section, each of said mold-sections being hinged at one side, means for opening and closing said mold-sections, means for rotating said rotatable mold-section about its axis while in contact with said stationary sections, a tank of water or other cooling liquid and means for submerging said rotatable mold-section in said liquid and returning it to its original position in contact with the stationary section.

LAWRENCE H. DOLAN.

Witnesses:
J. ERNST LIPPINCOTT,
STEPHEN L. O'BRYANT.